United States Patent
Ott

(10) Patent No.: US 11,565,249 B2
(45) Date of Patent: Jan. 31, 2023

(54) PIPETTING APPARATUS, A LIQUID HANDLING SYSTEM AND A METHOD OF CONTROLLING PIPETTING

(71) Applicant: TECAN TRADING AG, Mannedorf (CH)

(72) Inventor: Philipp Ott, Steg (CH)

(73) Assignee: TECAN TRADING AG, Mannedorf (CH)

( * ) Notice: Subject to any disclaimer, the term of this patent is extended or adjusted under 35 U.S.C. 154(b) by 295 days.

(21) Appl. No.: 16/954,414

(22) PCT Filed: Dec. 12, 2018

(86) PCT No.: PCT/EP2018/084515
§ 371 (c)(1),
(2) Date: Jun. 16, 2020

(87) PCT Pub. No.: WO2019/121217
PCT Pub. Date: Jun. 27, 2019

(65) Prior Publication Data
US 2021/0077992 A1     Mar. 18, 2021

(30) Foreign Application Priority Data
Dec. 22, 2017   (EP) .................................. 17210310.3

(51) Int. Cl.
*G01N 35/10*        (2006.01)
*B01L 3/02*         (2006.01)
(Continued)

(52) U.S. Cl.
CPC ............ *B01L 3/0217* (2013.01); *G01N 11/04* (2013.01); *G01N 13/02* (2013.01);
(Continued)

(58) Field of Classification Search
CPC ........... B01L 3/0217; B01L 2300/0832; B01L 2400/0478; B01L 3/0227; G01N 11/04;
(Continued)

(56) References Cited

U.S. PATENT DOCUMENTS 5,488,874 A    2/1996   Kawanabe
8,551,788 B2   10/2013  Ingenhoven
(Continued)

FOREIGN PATENT DOCUMENTS

CN    205392483   *  7/2016
CN    106415236   *  2/2017
(Continued)

OTHER PUBLICATIONS

European office action for corresponding European patent application No. EP17 210 310.3-1001, dated Jun. 23, 2021.
International Search Report and Written Opinion for corresponding PCT application No. PCT/EP2018/084515, dated Mar. 14, 2019.
European office action for corresponding European patent application No. EP17 210 310.3-1001, dated Dec. 16, 2020.

*Primary Examiner* — Robert R Raevis
(74) *Attorney, Agent, or Firm* — Notaro, Michalos & Zaccaria P.C.

(57) ABSTRACT

A pipetting apparatus having a pipette tube with a first end provided with an opening for aspirating and/or dispensing of a sample fluid and a second end operationally connected to a pressure generating means. The pipetting apparatus has at least one measuring unit adapted to determine at least one measurement value of the sample fluid based on the aspirating and/or dispensing of the sample fluid and to provide a sample fluid measurement signal representative thereof to an output of the measuring unit. The pipetting apparatus also has a control circuit operationally coupled to the output of the measuring unit and the input of the pressure generating means, the control circuit is configured to control said (Continued)

pressure generating device based on the sample fluid measurement signal.

21 Claims, 2 Drawing Sheets

(51) Int. Cl.
*G01N 11/04* (2006.01)
*G01N 13/02* (2006.01)

(52) U.S. Cl.
CPC ............... *G01N 35/1016* (2013.01); *B01L 2300/0832* (2013.01); *B01L 2400/0478* (2013.01); *G01N 2035/1025* (2013.01)

(58) Field of Classification Search
CPC ............. G01N 13/02; G01N 35/1016; G01N 2035/1025; G01N 11/06; G01N 11/08
USPC ........... 73/54.01, 54.02, 54.11, 54.14, 54.15, 73/54.19, 64.48–64.52, 304 R, 304 C, 73/864.23–864.25; 422/501, 504, 521, 422/522

See application file for complete search history.

(56) References Cited

U.S. PATENT DOCUMENTS

| | | |
|---|---|---|
| 11,249,099 B2 | 2/2022 | Wolter |
| 2007/0241130 A1 | 10/2007 | Curtis et al. |

FOREIGN PATENT DOCUMENTS

| | | | |
|---|---|---|---|
| EP | 1607747 | A2 | 12/2005 |
| EP | 1669762 | A1 | 6/2006 |
| EP | 2009449 | A1 | 12/2008 |
| WO | 2016166729 | A1 | 10/2016 |
| WO | 2017017084 | * | 2/2017 |

* cited by examiner

PIPETTING APPARATUS, A LIQUID HANDLING SYSTEM AND A METHOD OF CONTROLLING PIPETTING

TECHNICAL FIELD

The present invention is related to a pipetting apparatus for aspirating and/or dispensing volumes of fluids. Such a pipetting apparatus can be part of an automated fluid handling system as commonly used in medical, pharmaceutical and chemical laboratories, where sample fluids need to be processed quickly and reliably. The present invention is further related to a liquid handling system and a method of controlling pipetting in a pipetting apparatus.

BACKGROUND OF THE INVENTION

Laboratories conducting large-scale sample analysis in the medical, pharmaceutical or chemical industries require systems for rapidly and reliably handling fluid volumes. Pipetting of the sample fluids is at the core of these processes. Therefore, automated laboratory systems usually comprise one or more pipetting apparatuses operating on liquid containers situated e.g. on a worktable. One or more robots (in particular robotic arms) may be used for operating on such a worktable surface. These robots can carry liquid containers, such as sample tubes or microplates. Specialized robots can also be implemented as robotic sample processors (RSP) comprising one or more pipetting apparatuses for aspirating and dispensing liquids or merely for delivering of fluids. A central processor or computer usually controls these systems. The primary advantage of such a system is complete hands-free operation. Accordingly, these systems can run for hours or days at a time with no human intervention.

It is a problem in the state of the art that pipetting apparatuses are unable of pipetting fluids which are undefined (e.g. undefined liquid classes). Therefore, commonly used pipetting apparatuses require input of liquid classes of the used sample fluids in order to allow pipetting. Inputting respective liquid classes is cumbersome, time consuming and can be a source of errors.

It is therefore an object of the present invention to provide a pipetting apparatus, a liquid handling system and a method of controlling pipetting in a pipetting apparatus solving the problems in the state of the art. This object is solved by a pipetting apparatus, a liquid handling system and a method of controlling pipetting according to independent claims 1, 16 and 17. Specific embodiments of the pipetting apparatus and method according to the present invention are given in the dependent claims.

SUMMARY OF THE INVENTION

The present invention provides a pipetting apparatus comprising a pipette tube having a first end provided with an opening for aspirating and/or dispensing of a sample fluid and a second end operationally connected to a pressure generating means, wherein the pipetting apparatus comprises at least one measuring unit adapted to determine at least one measurement value of the sample fluid based on said aspirating and/or dispensing of the sample fluid and to provide a sample fluid measurement signal representative thereof to an output of the measuring unit, said pipetting apparatus further comprises a control circuit operationally coupled to the output of the measuring unit and the input of the pressure generating means, said control circuit is configured to control said pressure generating means based on the sample fluid measurement signal. The present invention provides a pipetting apparatus capable of pipetting undefined fluids, without the requirement to input liquid classes, based on a real-time measurement of a measurement value of the sample fluid. The at least one measurement value of the sample fluid allows the pipetting apparatus to control the pressure generating means in a closed loop control. The present invention allows to adapt aspiration parameters as the fluid is flowing into the pipette tube or flowing out of the pipette tube, based on the behavior of the aspirated fluid.

In an embodiment of the proposed pipetting apparatus the control circuit is configured to control the pressure generating means as a function of the sample fluid measurement signal in relation to time. In an example, the invention can be used in offline modus to allow for automatic liquid class optimization. In this approach, the pipette tubes of the inventive pipetting apparatus can be used for optimization. Further, in online modus, the invention can be used for closed loop pipetting. In this approach, the pipette tubes can be used within a customer application.

In an embodiment of the proposed pipetting apparatus the at least one measuring unit comprises a volume measurement unit. This approach allows volume controlled actuation of the pressure generating means, e.g. volume controlled movement of a plunger inside a cylinder.

In an embodiment of the proposed pipetting apparatus the volume measurement unit is adapted to determine a volume level of the sample fluid in the pipette tube and to provide a volume measurement signal representative thereof to the input of the control circuit. In this aspect, real-time control of the pipetted fluid can be achieved in a reliable manner. The invention is also able to provide process security, which can include check of fluid transfer, avoiding over-pipetting and control of pipetted volume. In a further approach, the inventive pipetting apparatus achieves automated liquid class optimization, involving workflow setup in less time and the ability to achieve reliable adaptation to customer fluids.

In an embodiment of the proposed pipetting apparatus the volume measurement unit comprises a first electrode, wherein said first electrode and a second electrode are configured to form a measuring capacitor, wherein the second electrode is at least partially provided by the sample fluid present into the pipette tube, said measuring capacitor is operationally connected to a computing means which is configured to, as a function of the capacity of the measuring capacitor, determine a volume level of the sample fluid in the pipette tube. This approach allows to determine the aspirated fluid volume in the pipette tube by using capacitance. The aspirated fluid inside the pipette tube acts as the second electrode or rather as a liquid electrode, which forms a capacitor with the first electrode.

In an embodiment of the proposed pipetting apparatus the first electrode is comprised by the pipette tube. In an example, the first electrode is fixed to the outside of the pipette tube. The first electrode can be formed film-liked, extending in axial direction of the pipette tube. The capacitance of this measuring capacitor is a function of the volume of sample fluid within the pipette tube. The capacitance signal allows to determine the sample fluid volume inside the pipette tube in real-time.

In an embodiment of the proposed pipetting apparatus the control circuit is configured to control the pressure generating means as a function of the volume measurement signal and time.

In an embodiment of the proposed pipetting apparatus the at least one measuring unit comprises a pressure measurement unit. This approach achieves pressure based control of the pressure generating means. In an example, this pressure based control can substitute the volume based control. In another example, the volume based control and pressure based control can act concurrently. Next to volume and pressure, control of the pressure generating means can be achieved based on further measurement values, as well.

In an embodiment of the proposed pipetting apparatus the pressure measurement unit is adapted to determine a pressure level inside the pipette tube and to provide a pressure measurement signal representative thereof to the input of the control circuit. This approach allows pressure based control of the pressure generating means, e.g. pressure controlled movement of a plunger inside a cylinder of the pressure generating means.

In an embodiment of the proposed pipetting apparatus the control circuit is configured to control the pressure generating means as a function of the pressure measurement signal and time.

In an embodiment the proposed pipetting apparatus further comprises a determining unit adapted to determine at least one sample fluid characteristic based on at least one of the volume measurement signal, at least one pressure generating means driving parameter and time. The at least one pressure generating means driving parameter can include information of respective positions of the plunger in relation to the cylinder of the pressure generating means, information of movement speed of the plunger, etc. In an example, the movement speed, movement curve, etc. of the plunger can be used to draw conclusions from viscosity of the sample fluid.

In an embodiment the proposed pipetting apparatus further comprises a determining unit adapted to determine at least one sample fluid characteristic based on at least one of the pressure measurement signal, the volume measurement signal, at least one pressure generating means driving parameter and time.

In an embodiment of the proposed pipetting apparatus the sample fluid characteristic comprises at least one of liquid classes, viscosity and surface tension of the sample fluid. The present invention allows to reliably determine the respective liquid class of the sample fluid.

In an embodiment of the proposed pipetting apparatus the pressure generating means comprises a combination of a plunger and a cylinder comprised by the pipetting apparatus, said plunger is axially movable within said cylinder in a circumferentially sealed manner, adapted to vary the pressure inside the cylinder, and a movement means configured to move the plunger in relation to the cylinder. In an embodiment of the proposed pipetting apparatus the movement means is operatively coupled to the output of the control circuit.

The present invention is further directed to an automated liquid handling system comprising a pipetting apparatus according to one of claims 1 to 15.

Moreover, the present invention is directed to a method of controlling pipetting in a pipetting apparatus according to one of claims 1 to 15. Said method comprises the steps of:
a) immersing the pipette tube by its first end into the sample fluid,
b) aspirating and/or dispensing the sample fluid into or out of the pipette tube,
c) determining at least one measurement value of the sample fluid based on said aspirating and/or dispensing of the sample fluid,
d) generating a sample fluid measurement signal representative of the measurement value of the sample fluid,
e) supplying said sample fluid measurement signal to the input of the control circuit,
f) controlling the pressure generating means by means of the control circuit based on the sample fluid measurement signal, and
g) returning to step b).

The inventive method can be used to assure process security and further to automatically optimize liquid classes in offline modus. In an example, the customer can load liquids which he wants to pipet into the liquid handling system, which then performs several iterative pipetting steps to characterize these liquids and to optimize the liquid classes automatically. After optimization, the customer can use standard pipette tubes together with the optimized liquid classes for his workflows. Furthermore, the customer can use the pipette tubes online in a customer application. The sample fluid measurement signal can be directly used for controlling the pressure generating means, e.g. a plunger thereof, of the pipetting apparatus in a closed loop control. The pipetting of every fluid sample can be optimized and online adjusted. The invention achieves great improvements, especially if the pipetted sample fluids have large viscosity and/or surface tension ranges.

In an embodiment of the proposed method the at least one measurement value of the sample fluid is at least one of a volume level of sample fluid in the pipette tube, a pressure level inside the pipette tube, and at least one pressure generating means driving parameter.

In an embodiment of the proposed method the step d) comprises generating a volume measurement signal representative of the volume level of the sample fluid in the pipette tube. In a further embodiment of the proposed method the step d) comprises generating a pressure measurement signal representative of the pressure level inside the pipette tube.

In an embodiment of the proposed method the step f) comprises controlling the pressure generating means as a function of at least one of the volume measurement signal, the pressure measurement signal and time. In an embodiment the proposed method further comprises the step of determining at least one sample fluid characteristic based on at least one of the volume measurement signal, at least one pressure generating means driving parameter and time.

In an embodiment the proposed method further comprises the step of determining at least one sample fluid characteristic based on at least one of the pressure measurement signal, the volume measurement signal, at least one pressure generating means driving parameter and time.

It is expressly pointed out that any combination of the above-mentioned embodiments is subject of further possible embodiments. Only those embodiments are excluded that would result in a contradiction.

BRIEF DESCRIPTION OF THE DRAWINGS

The present invention is further described with reference to the accompanying drawings jointly illustrating various exemplary embodiments which are to be considered in connection with the following detailed description. What is shown in the figures is.

DETAILED DESCRIPTION OF THE INVENTION

Figure 1:
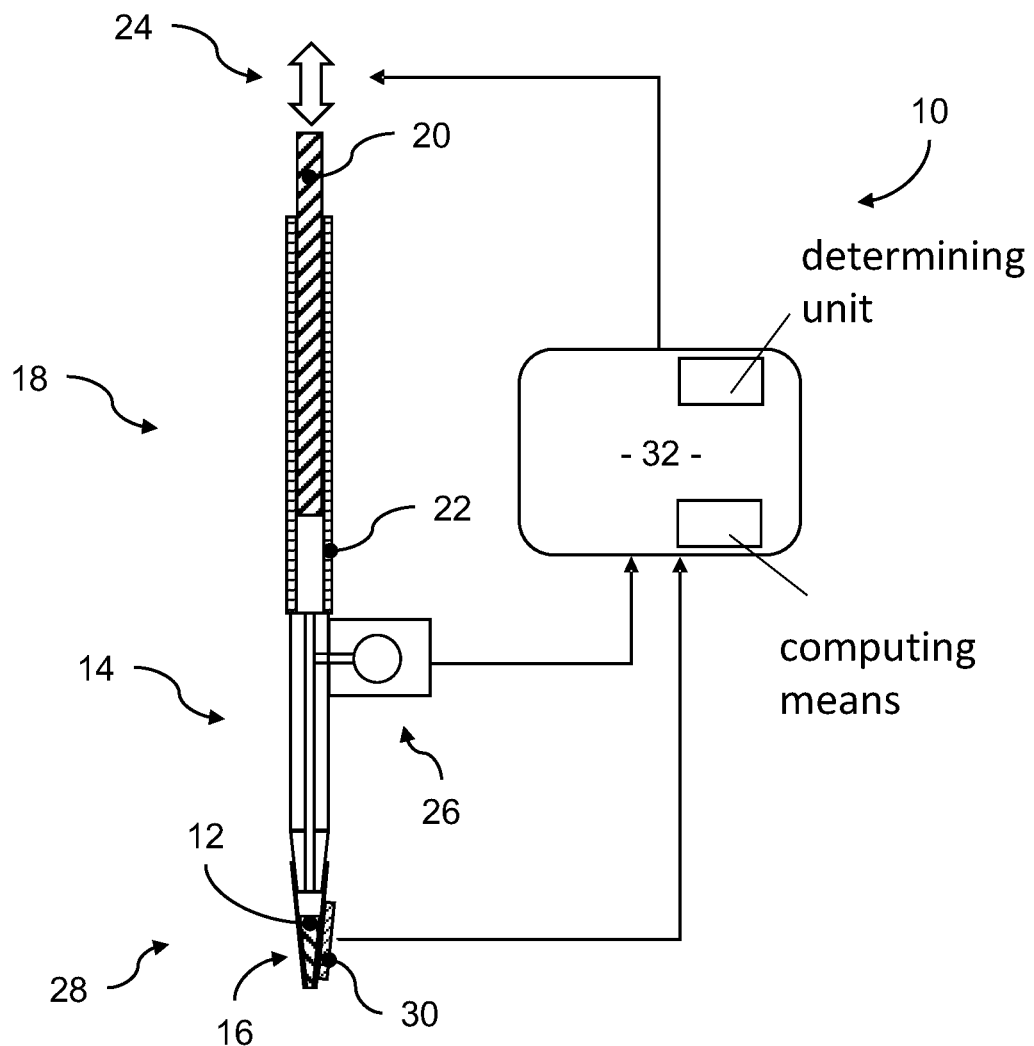
FIG. 1 schematically depicts a pipetting apparatus according to an aspect of the present invention.

FIG. 1 schematically depicts a pipetting apparatus 10 for aspirating and/or dispensing of sample fluid 12 inside a pipette tube 14. The sample fluid 12 is aspirated into or dispensed out of the pipette tube 14 via a disposable tip 16. While not shown, the pipette tube 14 can be formed integrally, i.e. without the disposable tip. The opposing end of the pipette tube 14 is operationally connected to a pressure generating means 18, such as a plunger/cylinder arrangement, a pump, etc. In the shown example, the pressure generating means 18 comprises a combination of a plunger 20 which is inserted into a cylinder 22. Said plunger 20 is axially movable within said cylinder 22 in a circumferentially sealed manner, adapted to vary the pressure inside the cylinder 22. Further comprised is a movement means 24 (schematically depicted as a double-arrow) configured to move the plunger 20 in relation to the cylinder 22.

The pipetting apparatus 10 further comprises a pressure measurement unit 26 operationally coupled to the pipette tube 14, adapted to determine a pressure level inside the pipette tube 14. Furthermore, the pipetting apparatus 10 comprises a volume measurement unit 28 provided to the pipette tube 14, adapted to determine a volume level of the sample fluid 12 inside the pipette tube 14. The volume measurement unit 28 comprises an electrode 30, which is fixed to the pipette tube 14 near the opening thereof. Details of the volume measurement unit 28 are described in the following.

Both the pressure measurement unit 26 and the volume measurement unit 28 are adapted to determine measurement values of the sample fluid based on aspirating and/or dispensing of the sample fluid 12. In particular, the pressure measurement unit 26 is adapted to determine a pressure level inside the pipette tube 14, while the volume measurement unit 28 is adapted to determine a volume level inside the pipette tube 14.

The pipetting apparatus 10 further comprises a control circuit 32 which receives measuring values of both the pressure measurement unit 26 and the volume measurement unit 28. In particular, the input of the control circuit 32 is supplied with a pressure measurement signal representative of the pressure level inside the pipette tube 14, wherein said pressure level being determined by the pressure measurement unit 26. Further, the input of the control circuit 32 is supplied with a volume measurement signal representative of the volume level inside the pipette tube 14, wherein said volume level being determined by the volume measurement unit 28. The output of the control circuit 32 is connected to the input of the pressure generating means 24, wherein said control circuit 32 is configured to control said pressure generating means 24 based on the received pressure measurement signal and/or volume measurement signal.

In an aspect, the control circuit 32 is configured to control the pressure generating means 24 as a function of the pressure measurement signal and/or volume measurement signal in relation to time. Based on the aspirating and/or dispensing of the sample fluid 12, the inventive pipetting apparatus 10 can determine at least one sample fluid characteristic based on at least one of the volume measurement signal, the pressure measurement signal, at least one pressure generating means driving parameter, and time. The sample fluid characteristic comprises at least one of liquid classes, viscosity and surface tension of the sample fluid 12. In an example, the pressure measurement signal and volume measurement signal are directly used to control the plunger 20 of the pressure generating means 18 in a closed loop circuit. In doing so, the pipetting of every sample fluid 12 can be optimized and online adjusted. The invention allows improved pipetting performance, especially if the pipetted sample fluid 12 has large viscosity and/or surface tension ranges.

Figure 2:
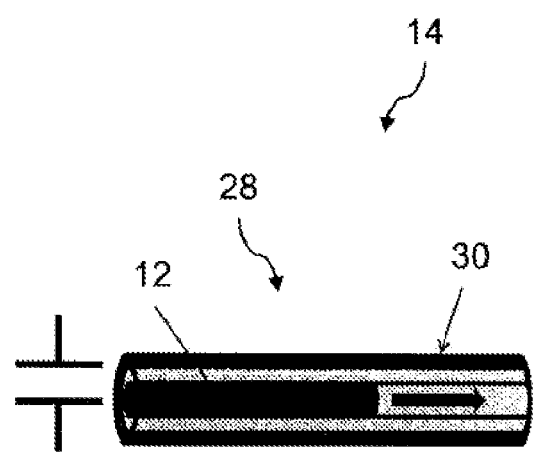
FIG. 2 schematically depicts an approach of liquid volume measurement inside a pipette tube.

FIG. 2 schematically depicts an approach of liquid level detection inside the pipette tube 14. In particular, said figure schematically shows a portion of the pipette tube 14, which portion forms the above-mentioned volume measurement unit 28 (refer to FIG. 1). The volume measurement unit 28 comprises a first electrode 30, which is at least partially mounted to the outer wall of the pipette tube 14. The volume measurement unit 28 further comprises a second electrode 12, which is at least partially provided by the amount of sample fluid 12 present into the pipette tube 14. Hence, the aspirated sample fluid 12 inside the pipette tube 14 acts as a liquid electrode, wherein the first electrode 30 and the second electrode 12 form a measuring capacitor. Said measuring capacitor is operationally connected to a computing means (not shown) which is configured to, as a function of the capacity of the measuring capacitor, determine a volume level of the sample fluid 12 inside the pipette tube 14. Hence, the volume of the aspirated sample fluid 12 inside the pipette tube 14 is determined by using the capacitance. The capacitance of the measuring capacitor is a function of the fluid sample volume within the tubular pipette tube 14. Therefore, the measured capacitance allows to determine the volume of sample fluid 12 inside the pipette tube 14 in real time.

The invention claimed is:

1. A pipetting apparatus (10) comprising a pipette tube (14) having a first end provided with an opening for aspirating and/or dispensing of a sample fluid (12) and a second end operationally connected to a pressure generating means (18), wherein the pipetting apparatus (10) comprises at least one measuring unit (26,28) adapted to determine at least one measurement value of the sample fluid based on said aspirating and/or dispensing of the sample fluid (12) and to provide a sample fluid measurement signal representative thereof to an output of the measuring unit (26,28), said pipetting apparatus (10) further comprises a control circuit (32) operationally coupled to the output of the measuring unit (26,28) and the input of the pressure generating means (18), said control circuit (32) is configured to control said pressure generating means (18) based on the sample fluid measurement signal, wherein the at least one measuring unit (26,28) comprises a volume measurement unit (28) comprising a first electrode (30) comprising the pipette tube or an electrode fixed to the outside of the pipette tube, wherein said first electrode (30) and a second electrode (12) are configured to form a measuring capacitor, wherein the second electrode (12) is at least partially provided by the sample fluid (12) present into the pipette tube (14), said measuring capacitor is operationally connected to a computing means which is configured to, as a function of the capacity of the measuring capacitor, determine a volume level of the sample fluid (12) in the pipette tube (14).

2. The pipetting apparatus (10) according to claim 1, wherein the control circuit (32) is configured to control the pressure generating means (18) as a function of the sample fluid measurement signal in relation to time.

3. The pipetting apparatus (10) according to claim 1, wherein the volume measurement unit (28) is adapted to determine a volume level of the sample fluid (12) in the pipette tube (14) and to provide a volume measurement signal representative thereof to the input of the control circuit (32).

4. The pipetting apparatus (10) according to claim 1, wherein the first electrode (30) is comprised by the pipette tube (14).

5. The pipetting apparatus (10) according to claim 1, wherein the control circuit (32) is configured to control the pressure generating means (18) as a function of the volume measurement signal and time.

6. The pipetting apparatus (10) according to claim 1, wherein the at least one measuring unit (26,28) comprises a pressure measurement unit (26).

7. The pipetting apparatus (10) according to claim 6, wherein the pressure measurement unit (26) is adapted to determine a pressure level inside the pipette tube (14) and to provide a pressure measurement signal representative thereof to the input of the control circuit (32).

8. The pipetting apparatus (10) according to claim 7, wherein the control circuit (32) is configured to control the pressure generating means (18) as a function of the pressure measurement signal and time.

9. The pipetting apparatus (10) according to claim 7, further comprising a determining unit adapted to determine at least one sample fluid characteristic based on at least one of the pressure measurement signal, the volume measurement signal, at least one pressure generating means driving parameter and time.

10. The pipetting apparatus (10) according to claim 1, further comprising a determining unit adapted to determine at least one sample fluid characteristic based on at least one of the volume measurement signal, at least one pressure generating means driving parameter and time.

11. The pipetting apparatus (10) according to claim 10, wherein the sample fluid characteristic comprises at least one of liquid classes and viscosity of the sample fluid.

12. The pipetting apparatus (10) according to claim 1, wherein the pressure generating means (18) comprises a combination of a plunger (20) and a cylinder (22) comprised by the pipetting apparatus (10), said plunger (20) is axially movable within said cylinder (22) in a circumferentially sealed manner, adapted to vary the pressure inside the cylinder (22), and a movement means (24) configured to move the plunger (20) in relation to the cylinder (22).

13. The pipetting apparatus (10) according to claim 12, wherein the movement means (24) is operatively coupled to the output of the control circuit (32).

14. An automated liquid handling system comprising a pipetting apparatus (10) according to claim 1.

15. A method of controlling pipetting in a pipetting apparatus (10) according to claim 1, said method comprising the steps of:
a) immersing the pipette tube (14) by its first end into the sample fluid (12),
b) aspirating and/or dispensing the sample fluid (12) into or out of the pipette tube (14),
c) determining at least one measurement value of the sample fluid based on said aspirating and/or dispensing of the sample fluid (12),
d) generating a sample fluid measurement signal representative of the measurement value of the sample fluid,
e) supplying said sample fluid measurement signal to the input of the control circuit (32), F)
f) controlling the pressure generating means (18) by means of the control circuit (32) based on the sample fluid measurement signal, and
g) returning to step b).

16. The method according to claim 15, wherein the at least one measurement value of the sample fluid is at least one of a volume level of sample fluid in the pipette tube (14), a pressure level inside the pipette tube (14), and at least one pressure generating means driving parameter.

17. The method according to claim 16, wherein the step d) comprises generating a volume measurement signal representative of the volume level of the sample fluid in the pipette tube (14).

18. The method according to claim 17, wherein the step f) comprises controlling the pressure generating means (18) as a function of at least one of the volume measurement signal, the pressure measurement signal and time.

19. The method according to claim 17, further comprising the step of determining at least one sample fluid characteristic based on at least one of the volume measurement signal, at least one pressure generating means driving parameter and time.

20. The method according to claim 16, wherein the step d) comprises generating a pressure measurement signal representative of the pressure level inside the pipette tube (14).

21. The method according to claim 20, further comprising the step of determining at least one sample fluid characteristic based on at least one of the pressure measurement signal, the volume measurement signal, at least one pressure generating means driving parameter and time.

* * * * *